Aug. 15, 1939     H. H. B. LUND     2,169,701
APPARATUS FOR THE GERMINATION OF SEEDS AND THE GROWTH OF SEEDLINGS
Filed March 20, 1937     3 Sheets-Sheet 1
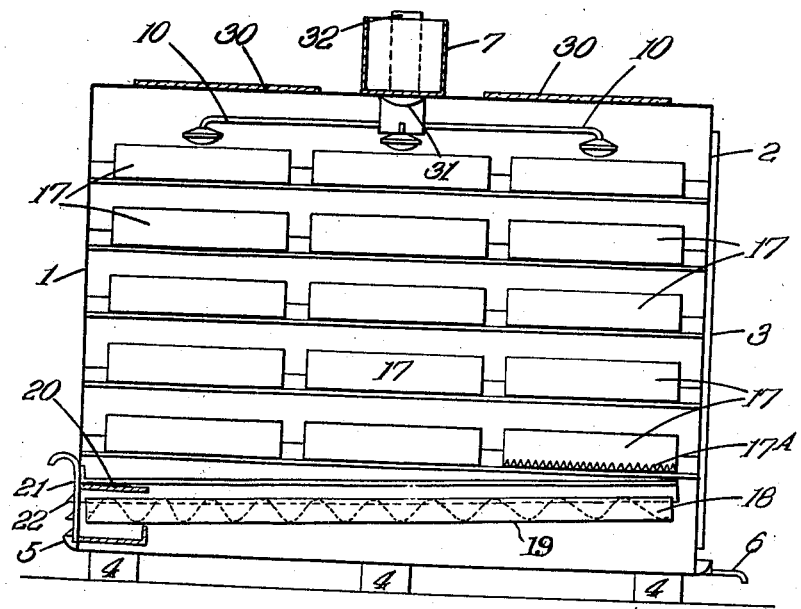
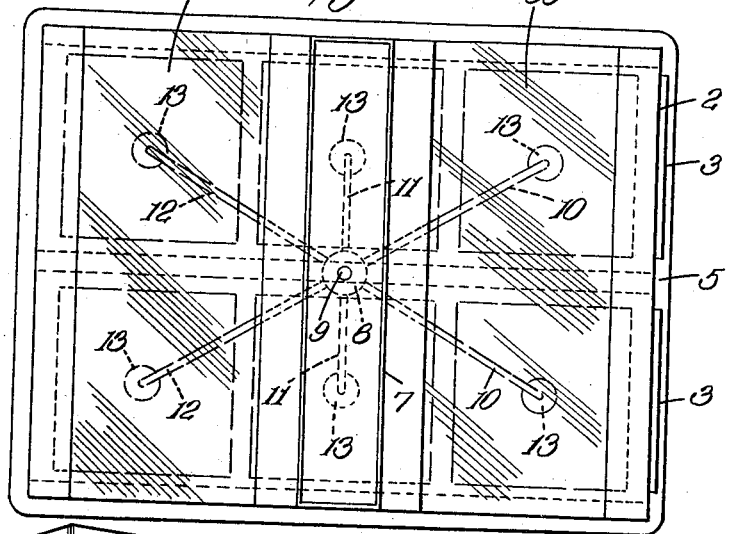
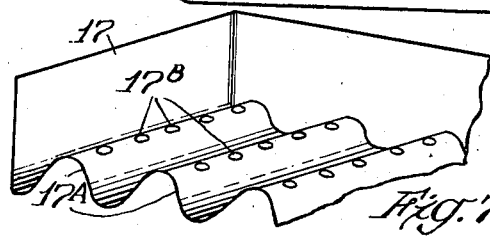
INVENTOR:
HENRY HILTON BLAIR LUND
BY Haseltine Lake & Co.
ATTORNEYS

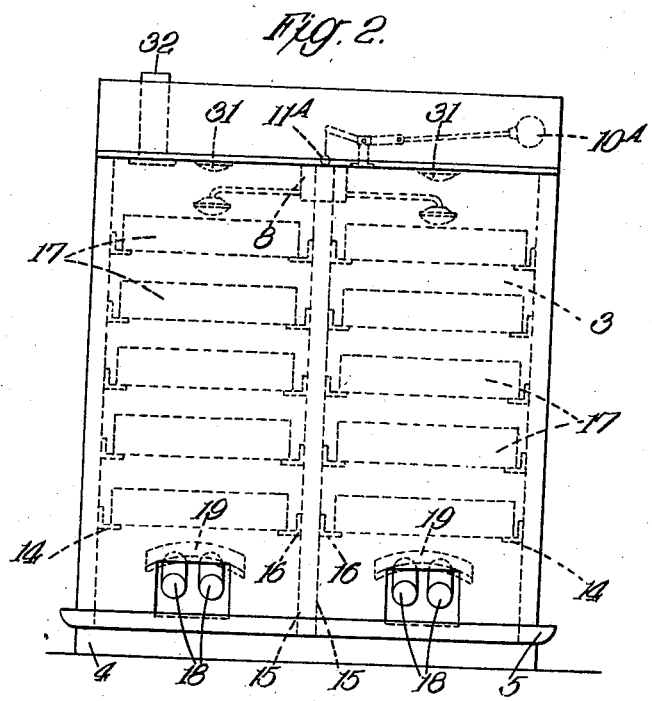
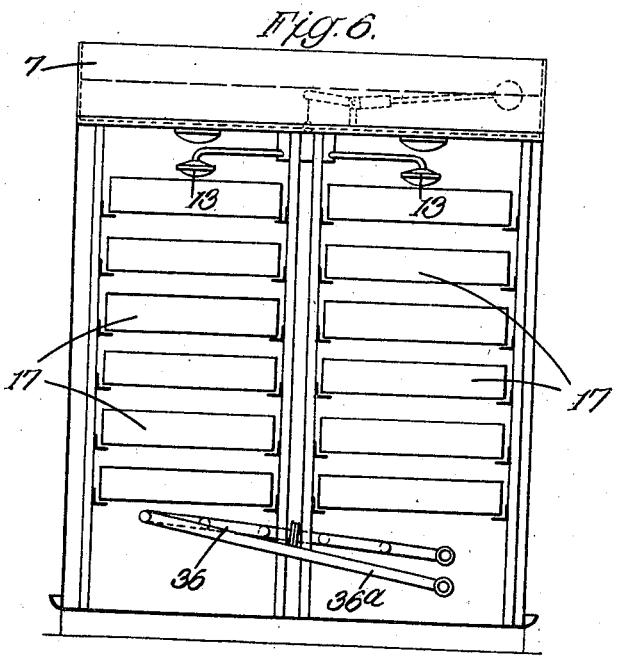

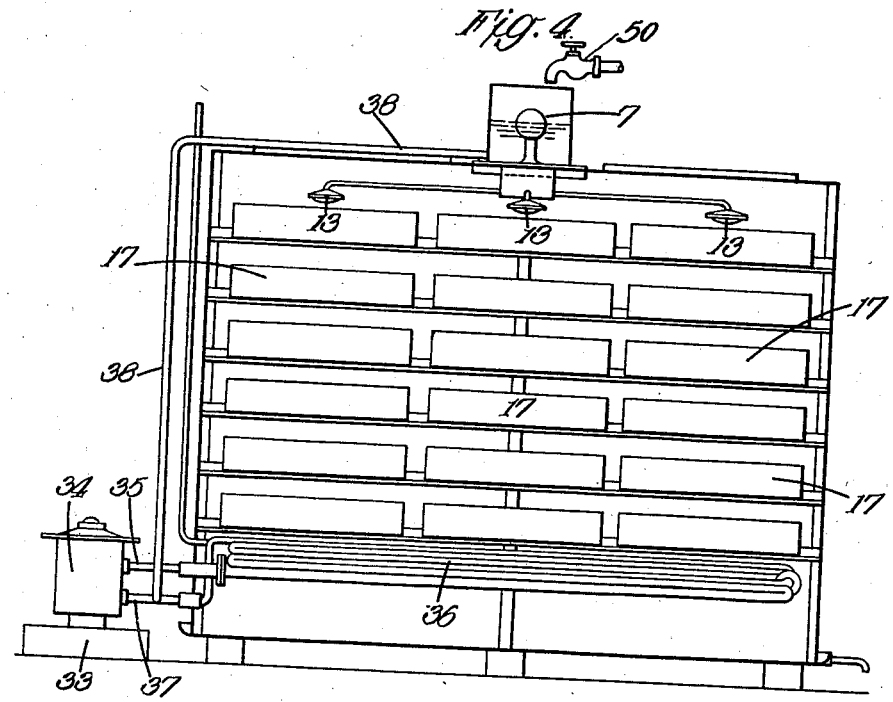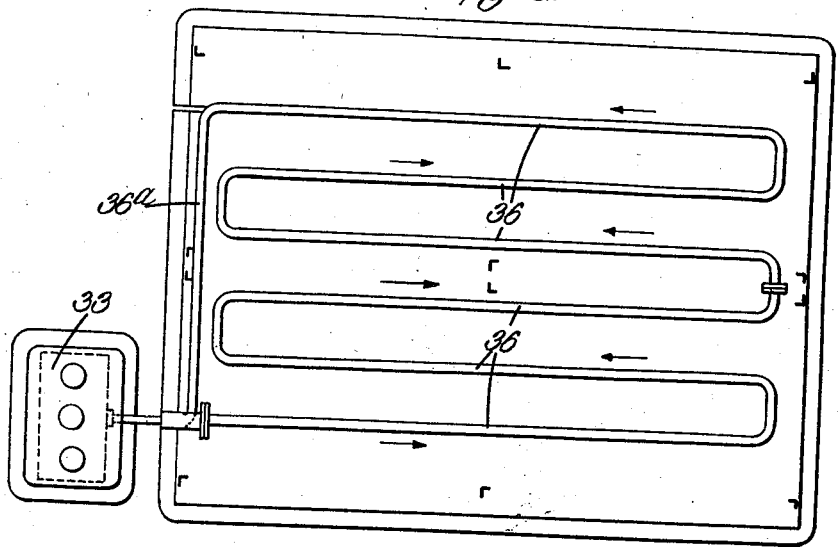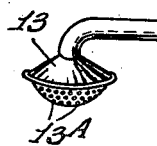

Patented Aug. 15, 1939

2,169,701

UNITED STATES PATENT OFFICE 2,169,701

APPARATUS FOR THE GERMINATION OF SEEDS AND THE GROWTH OF SEEDLINGS

Henry Hilton Blair Lund, London, England

Application March 20, 1937, Serial No. 132,055
In Great Britain March 26, 1936

7 Claims. (Cl. 47—16)

This invention relates to apparatus for the germination of seeds and the growth of seedlings for human food, fodder, and the like, and is concerned with the provision of a soil-less cultivation cabinet of the type consisting of a closed cabinet having means for heating the interior of the cabinet to a desired temperature, and having internally arranged trays for the reception of seeds or seedlings, there being means for supplying a fertiliser liquid to the trays. Various arrangements have been proposed for causing the fertiliser liquid to enter the different trays, and the present invention has for its chief object to evolve an improved arrangement for supplying the liquid, in a way which will not only ensure satisfactory distribution of the liquid but which will at the same time enable the construction of the cabinet to be simplified.

According to the invention a soil-less cultivation cabinet of the type referred to, has means for supplying a fertiliser liquid to the trays consisting of a sprinkler system adapted to sprinkle the fertiliser liquid, and also has the trays arranged one above the other in a group or groups, such trays being individually formed so that liquid may percolate through them, the fertiliser liquid being sprinkled upon an upper tray of a group so that the liquid may percolate from one tray to the next, to the lowest and last tray in the group. The sprinkler system preferably comprises a source of fertiliser liquid and means for periodically releasing a predetermined quantity of such liquid, the released liquid being supplied to one or more sprinklers according to the number of groups of the superposed trays, the or each such sprinkler being arranged over the upper tray of a group of the trays.

In order that the invention may be clearly understood and readily carried into effect the same will now be described more fully with reference to the accompanying drawings, in which:—

Figure 1 is a sectional side elevation through a cultivation cabinet in accordance with the invention;

Figures 2 and 3 are corresponding end and plan views respectively of the cabinet shown in Fig. 1;

Figure 4 is a view similar to Figure 1 of a modified form of cabinet, and

Figures 5 and 6 respectively show plan and end views respectively, of the cabinet shown in Figure 4.

Figures 7 and 8 show, to an enlarged scale, respectively, a detail of the perforate lower wall of one of the trays illustrated in the other figures, and a detail of a sprinkler rose.

Referring first to the constructional embodiment of the invention shown in Figures 1 to 3, there is a main sheet metal body 1 forming a closed cabinet, one end of the cabinet having a pair of doors 2, 3, affording access to the interior of the cabinet. The body 1 is supported upon wooden joists 4, a tray 5 being interposed between the cabinet at the upper sides of the joists. A short drain pipe 6 opens into the tray 5, so that liquid in such tray will be drained away when it reaches the pipe 6.

The body 1 supports upon its upper side a trough 7, the trough being rectangular in shape and lying transversely across the cabinet. The underside of the trough is formed with a well 8 connecting with the trough through an aperture 9. The trough 7 has arranged within it a mechanism including a ball-float 10A and a ball control valve 11A, the latter being so arranged that when the ball-float 10A is lifted beyond a predetermined position, the ball 11A also rises. The ball 11A otherwise remains seated over the aperture 9, whereby any liquid in the trough 7 is normally prevented from, or substantially prevented from, egress through the aperture 9. The well 8 carries a number of branch pipes 10, 11 and 12, the pair 10 being situated so as to terminate over points adjacent the front end of the cabinet, the pair 11 terminating substantially centrally within the cabinet, and finally the pair 12 being arranged to terminate at the rear end of the cabinet. All the pipes 10, 11 and 12 are arranged horizontally and extend near the interior upper wall of the body 1. Each pipe terminates in a sprinkler rose 13. In Figure 8 a detail of a rose 13 is shown, and it will be seen that there are perforations 13A therein to allow the egress of liquid.

The longitudinal side walls of the body 1 have angle section supports 14 arranged adjacent to them, the supports being positioned above one another as indicated in Figure 3. Furthermore, angle-section vertical members 15 are secured at back and front, and intermediate these points if necessary, within the cabinet to support further angle-section horizontal members 16, the members 16 being parallel with the members 14, and each member 16 being opposite a corresponding member 14. Thus trays 17 may be slid upon the members 14 and 16, which latter afford runners for such trays. The cabinet illustrated is intended to receive three trays on each pair of runners 14 and 16, as may be seen from Figure 1. The trays are thus arranged in superposed horizontal sets, each horizontal set including six trays. When all the trays are in position within the cabinet, it will be understood that there will be six vertical groups of trays, each group being located so that there is a rose 13 arranged vertically above, and substantially centrally with respect to, the uppermost tray of each of the vertical group of trays.

As may be seen from Figure 3, the trays do not extend to the bottom of the body 1, and the space below the last tray is occupied by heating elements. In the example illustrated these elements consist of electric heater tubes 18, there being two pairs of such heater tubes. Each tube slopes upwardly from the rear of the cabinet towards the front thereof, and over each pair of tubes a distributing baffle 19 is located. The baffles 19 also slope upwardly from the rear of the cabinet towards the front end thereof. Suitable ties and braces (not shown) serve to support the heater tubes and the baffles therefor. The ends of the heater tubes at the rear end of the cabinet, are received in protective boxes 20, there being one such box 20 for each pair of tubes 18. The rear sides of the boxes 20 are left open, and apertures are formed in the rear wall of the body 1 of the cabinet, the apertures in the body 1 being closed by louvre shutters 21, the latter being received in guides secured to the rear wall of the body 1. The louvres 22 in the shutters 21 allow the ingress of air into the cabinet.

When the cabinet is in use, a dribble cock 50 is arranged to supply a constant amount of water containing artificial fertiliser, to the trough 7. When the trough 7 is empty, the ball-float 10A is at its lowest position, and the ball 11A rests upon its seating, so that there is substantially no connection between the trough 7 and the well 8. As the level of the liquid in the trough 7 begins to rise, the ball-float 10A will also rise to a predetermined point, where the ball-float 10A causes the ball 11A to be lifted rapidly from its seat. The mechanism inter-connecting the ball-float 10A and the ball control valve 11A forms the subject of my co-pending United States Patent No. 2,145,052, and is described in my published English Patent No. 468,992. When the ball control valve 11A is lifted from its seat, there is a rapid flow of liquid from the trough 7 into the well 8, and from thence into the pipes 10, 11 and 12, such liquid finally being sprinkled through the roses 13. As explained above, sets of trays are arranged within the cabinet so that they form vertical groups located below the roses 13, the liquid discharged through the roses 13, thus falling upon the uppermost tray of each group. Each tray 17 preferably has a corrugated bottom wall 17A, there being perforations along the tops of such corrugations, as will be seen from the detail shown in Figure 7, the perforations being indicated at 17B. When the cabinet is in use, seeds or seedlings are present in the trays 17, and the liquid sprinkled through the roses 13 after entering the top tray, percolates therethrough into the lower trays successively. The frequency with which the sprinkler roses discharge the liquid fertiliser, may obviously be regulated by proper control of the dribble cock feeding the trough 7. The sprinkled liquid after passing through all the trays, falls to the bottom of the cabinet, and is collected in the tray 5, and finally escapes through the outlet pipe 6 formed upon such tray. The heater tubes 18 are protected from direct contact with the down flowing fertiliser liquid by the arrangement of the baffles 19, and the rear ends of the tubes 18 are further protected by the enclosing boxes 20 referred to above. It is at the rear end of the tubes 18 that electric connections are intended to be made for the supply of the necessary heating current. When seeds are being sprouted in the cabinet, the temperature within the cabinet is raised to a predetermined point by means of the heater tubes 18. By reason of the disposition of these tubes and also the disposition of the baffles 19, there is a gentle intake of air through the louvres 22, such air being heated and passed over the front of the baffles 19 after travelling along thereunder, the heated air then rising to the upper parts of the cabinet. The heating of the interior of the cabinet generally, will be kept substantially uniform by reason of the provision of the baffle plates 19. In order that the cabinet may as a whole be kept at a temperature desirable for the germination and sprouting of seeds, a thermostat of known character is preferably arranged within the cabinet, and serves to control the supply of electrical heating energy to the heater tubes 18.

For the purpose of greening off a sprouted crop, the upper side of the cabinet preferably has glass inserts 30, whereby natural light is admitted to the cabinet and may fall upon four of the trays in the top set. It will be understood that the two centre trays in the top set will have above them that part of the upper wall of the cabinet 1 which supports the trough 7. In order that the two central trays might also receive light for the purposes of greening, electric lamps covered by glass protectors 31 are conveniently situated on the underside of the central portion of the upper wall of the cabinet.

An outlet flue 32 is arranged to extend up through the trough 7. In this way heated gases are released from the upper part of the cabinet, and simultaneously the fertiliser liquid in the trough 7 will be somewhat pre-heated.

In using the apparatus described, unsprouted seeds may be placed in the lower trays, such trays being shifted day by day towards the top of the cabinet, and further trays with more unsprouted seeds introduced at the bottom of the cabinet. In this way a continuous supply of green sprouted fresh fodder is available from the upper trays of the cabinet.

In Figures 4, 5 and 6 of the drawings, an arrangement similar to that described above, is shown. As before, there is a trough 7 and sprinkler roses 13, with groups of superposed trays 17 located below the sprinkler roses. In this example, however, the heating arrangement are modified. There is an external oil heater 33, such heater having a detachable boiler 34. The boiler 34 has an outflow connection 35 which enters the cabinet, and is joined with water pipes 36 situated within the cabinet. The pipes 35 have a sinuous form and are substantially co-planar. The plane containing the pipes 36, as may be seen from Figure 6, slopes upwardly from the outflow 35. The highest point of the sinuous pipe system 36 connects through a downwardly directed pipe 36a with the inflow or return pipe 37 of the boiler. The feed of water to the boiler in order to replace small losses which must occur after a period of running, is obtained from the trough 7. There is connected at the bottom of the trough 7 a pipe 38 which is also connected with the return pipe 37 of the boiler. To prevent air-locks in the circulatory hot water system, a small bore pipe 39 is also connected at the highest point in the system, such pipe 39 extending upwardly to a height corresponding to the high level in the trough 7.

With the circulatory system described above, it will be understood that the oil heater 33 causes the water in the boiler 34 to be heated and to flow through the outflow pipe 35 into the system of sinuous hot water pipes 36. The heated water flows upwardly through the pipes 36 to the highest point therein, and then returns through the pipe 36a to the return flow pipe 37 of the boiler. By means of the pipe 38 the supply of water in the circulatory system is from time to time replenished. This hot water system for the heating of a cultivation cabinet, forms the subject of my co-pending United States Patent No. 2,153,871, corresponding to British Patent No. 473,012.

It will be understood that in conjunction with the sprinkler system obtained with the aid of the trough 7 and the roses 13, various types of heating means for the cabinet may be employed.

In the above description, the trays for containing the seeds or seedlings, have been stated to be perforated along the tops or apices of the corrugations formed in the bottom plates of the trays. Whilst for the purposes of the present invention a tray through which the fertiliser liquid will percolate, is the main desired feature of the tray, I prefer to employ an improved tray forming the subject of my co-pending United States Patent application Serial No. 152,266, filed 6th July, 1937, corresponding to British Patent No. 473,010.

What I claim and desire to secure by Letters Patent of the United States is:

1. A soil-less cultivation cabinet for the germination of seeds and the growth of seedlings and including heating means for heating the interior of the cabinet and a plurality of trays therein for the reception of the seeds and seedlings, comprising at least one group of trays arranged one above the other, a source of fertiliser liquid, means for periodically releasing a predetermined quantity of such liquid, a sprinkling means arranged one above each group of trays and a connection between the sprinkling means and the means for periodically releasing a predetermined quantity of fertiliser liquid to allow the latter to be supplied to the top tray of a group, each tray having a perforate horizontal lower wall.

2. A soil-less cultivation cabinet for the germination of seeds and the growth of seedlings, including heating means for heating the interior of the cabinet and a plurality of trays for the reception of the seeds and seedlings, comprising at least one group of trays having perforate horizontal lower walls and arranged one below the other, a trough disposed at the upper part of the cabinet, a sprinkling means arranged over each group of the trays, means for supplying liquid to said trough at a predetermined rate, means within the trough responsive to the liquid level therein to release the contents thereof through connections when the level rises above a predetermined point, said connections joining each with a sprinkling means.

3. A soil-less cultivation cabinet for the germination of seeds and the growth of seedlings and including heating means for heating the interior of the cabinet and a plurality of trays therein for the reception of the seeds and seedlings, comprising at least one group of trays arranged one below the other in the cabinet, a sprinkling means arranged above the top tray of each group of trays, a source of fertilising liquid and a connection from said source to each sprinkling means, each of the trays within the cabinet having a corrugated horizontal bottom wall with perforations made along the tops of the corrugations.

4. A soil-less cultivation cabinet for the germination of seeds and the growth of seedlings and including a plurality of trays within the cabinet for the reception of the seeds and seedlings, and comprising a plurality of groups of the said trays, the trays being arranged one above the other in each group, a plurality of sprinkling means located in the upper part of the cabinet with each sprinkling means above the top tray of a group of trays, means for supplying fertiliser liquid to said sprinkling means, the lower walls of all the trays being horizontal and perforate, and heating means located within the lower part of the cabinet and arranged to heat the interior thereof.

5. A soil-less cultivation cabinet for the germination of seeds and the growth of seedlings and including heating means for heating the interior of the cabinet, and a plurality of trays therein for the reception of the seeds and seedlings, comprising at least one group of the trays arranged one above the other, the trays having perforate horizontal lower walls and a sprinkler rose arranged over the top tray of a group and arranged to periodically discharge fertiliser liquid on to such top tray.

6. A soil-less cultivation cabinet for the germination of seeds and the growth of seedlings and including heating means for heating the interior of the cabinet, and a plurality of trays therein for the reception of seeds and seedings and means for supplying fertiliser liquid to the trays, comprising at least one group of the trays arranged one below the other, said trays having perforate horizontal lower walls and sprinkling means disposed over the top tray of said group of trays and a connection from said sprinkling means to a source of fertiliser liquid, and glass inserts in the upper part of the cabinet to allow light to enter therein and at least one artificial light within the cabinet, to augment the light entering through the glass inserts.

7. A soil-less cultivation cabinet for the germination of seeds and the growth of seedlings, comprising at least one group of trays arranged one above the other within the cabinet, said trays having perforate horizontal lower walls, sprinpling means arranged above the top tray of each group, means for supplying fertiliser liquid to the trays periodically through said sprinkling means, electric heater tubes disposed in the lower part of the cabinet and a heat-distributing baffle arranged above said heater tubes.

HENRY HILTON BLAIR LUND.